United States Patent Office 2,989,035
Patented June 20, 1961

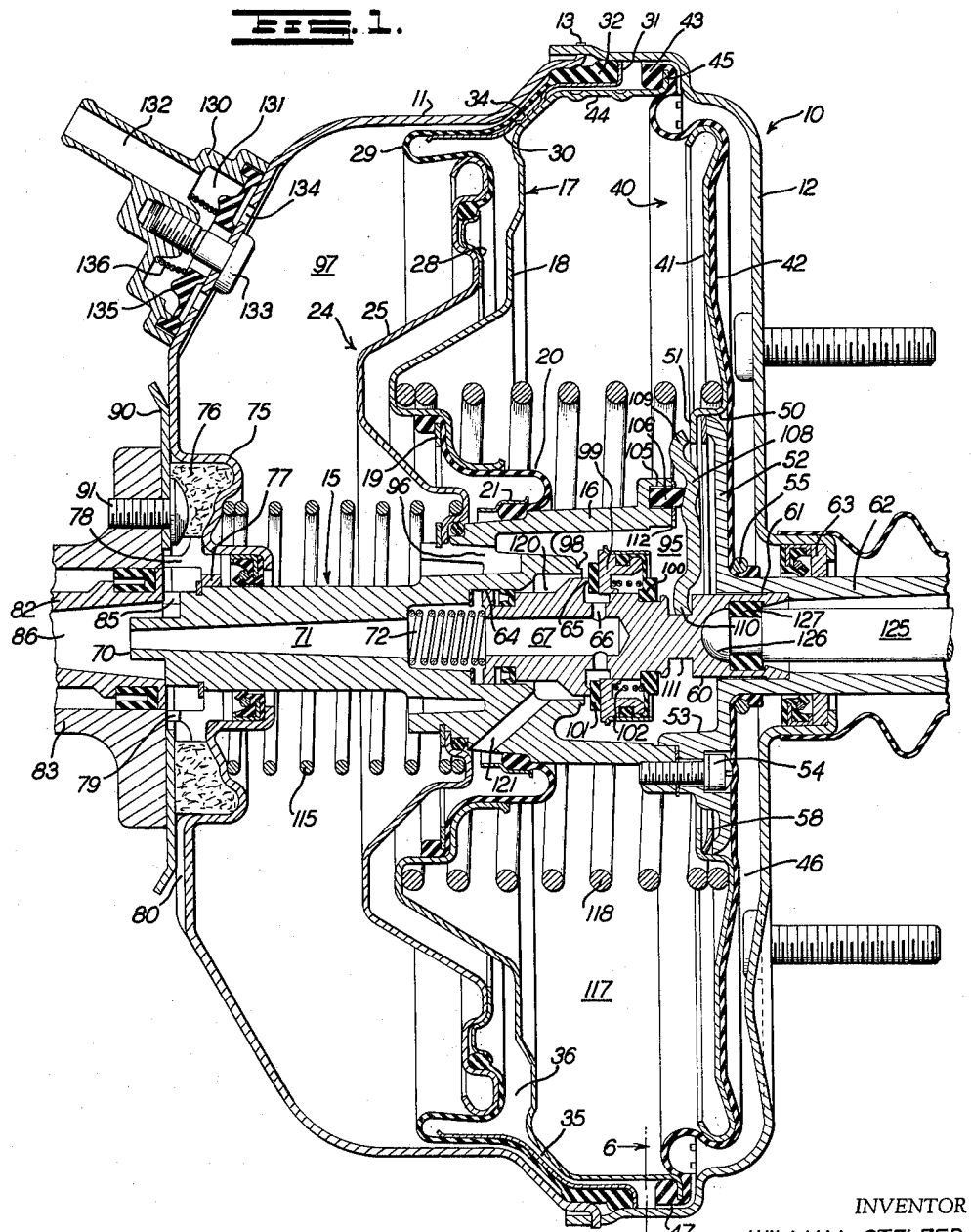

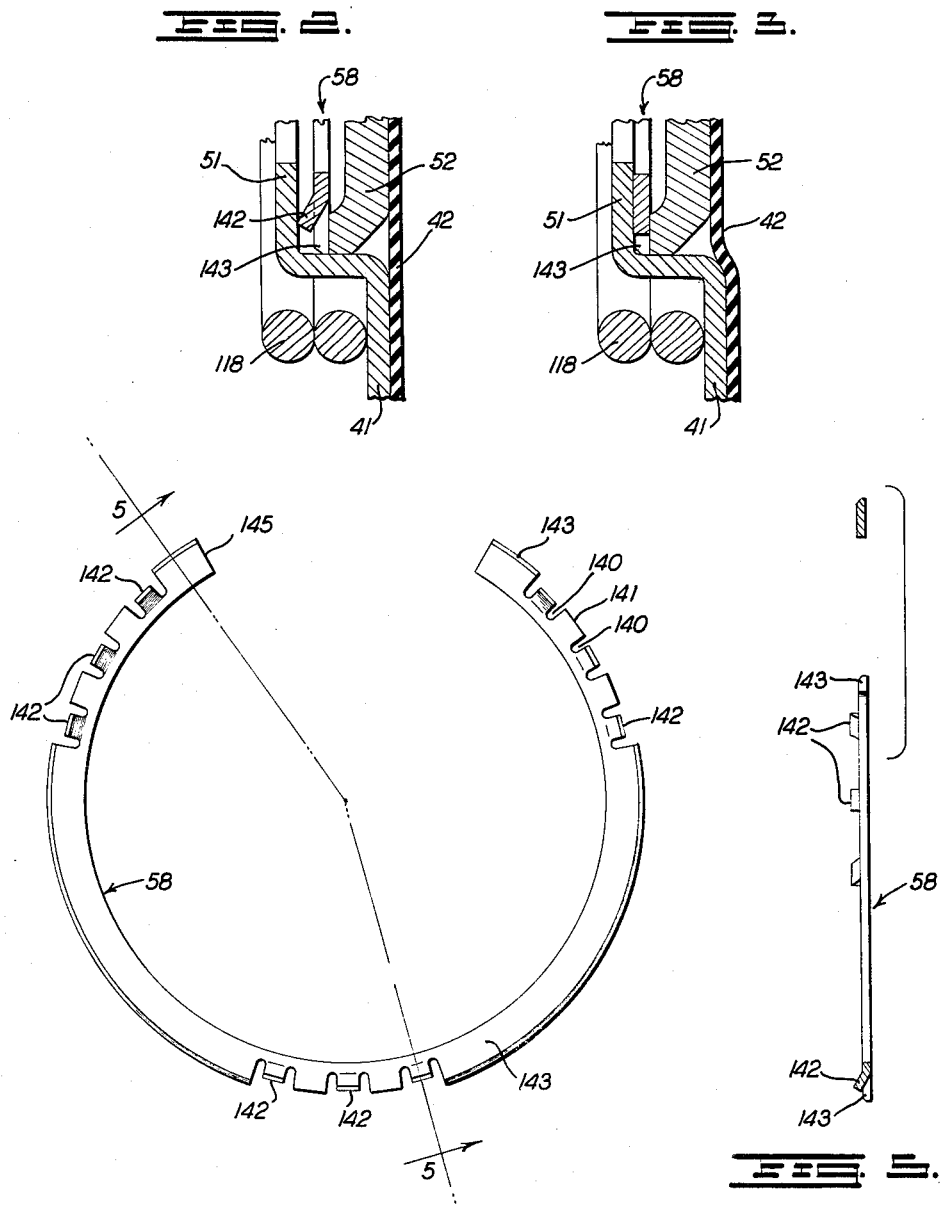

2,989,035
FLUID PRESSURE MOTOR MECHANISM
William Stelzer, Bloomfield Hills, Mich., assignor to Kelsey-Hayes Company, Detroit, Mich., a corporation of Delaware
Filed Oct. 8, 1959, Ser. No. 845,250
14 Claims. (Cl. 121—41)

This invention relates to a fluid pressure motor mechanism and is an improvement over the structure shown in my copending application Serial No. 760,164, filed September 10, 1958, now Patent No. 2,980,068, granted April 18, 1961.

In my copending application referred to, I have disclosed a novel type of tandem motor mechanism wherein a pair of pressure responsive units in a single casing each has a variable pressure chamber at one side thereof, both units having mechanical connection with a member to be operated. The motor mechanism is primarily intended for use in operating master cylinder plungers for vehicle brake systems, and the use of two pressure responsive units obviously increases the power of a fluid pressure motor of given diameter. The mechanism provides novel means for employing a single valve mechanism to control the pressure in the two variable pressure chambers, and includes novel means for maintaining such chambers in communication with each other whereby operation of the valve mechanism to change the pressure in one pressure chamber operates to control the pressure in both such chambers.

Moreover, the mechanism of the copending application referred to provides novel means for utilizing force generated by one of the pressure responsive units to transmit reaction through lever means to the valve operating element which, in a brake system, is connected to the brake pedal. In the prior construction, the lever mechanism is associated with the pressure responsive unit remote from the brake pedal, and the follow-up valve mechanism includes a valve element flexibly carried by the other pressure responsive unit.

An important object of the present invention is to provide a motor mechanism of the type referred to wherein the structure and arrangement of parts as well as problems of assembly are greatly simplified.

A further object is to provide in a motor mechanism of this character a mounting of the valve mechanism which is simplified and improved over the prior construction, the valve element of the follow-up valve mechanism being supported in a simple manner by the axially movable valve operating element.

A further object is to provide a simplified type of the die-cast axial portions of the pressure responsive units, at least one part being eliminated and the remaining parts being simplified both as to construction and assembly.

A further object is to provide a simplified mounting of the reaction levers, associated in the present means with the pressure responsive unit closest to the brake pedal, and to provide novel means for eliminating play between the reaction levers and the elements with which they are engageable when the parts are in the normal off positions, thus eliminating any tendency for the valve mechanism to chatter.

Other objects and advantages of the invention will become apparent during the course of the following description.

In the drawings I have shown one embodiment of the invention. In this showing:

FIGURE 1 is an axial sectional view through the motor mechanism with the parts in the normal off positions, portions of the brake operated valve actuating rod and portions of the vehicle master cylinder being shown;

FIGURE 2 is an enlarged fragmentary sectional view of a portion of one of the pressure responsive units and associated elements showing play take-up means in normal position;

FIGURE 3 is a similar view showing the parts in the positions they will assume after the mechanism has been placed in operation;

FIGURE 4 is a detail face view of the play take-up ring;

FIGURE 5 is a detail sectional view on line 5—5 of FIGURE 4; and

FIGURE 6 is a fragmentary detail sectional view on line 6—6 of FIGURE 1.

Referring to FIGURE 1, the numeral 10 designates the motor mechanism as a whole comprising casing sections 11 and 12 connected at their free edges in any suitable manner as at 13.

A die-cast body indicated as a whole by the numeral 15 is arranged axially within the casing sections and is provided with an enlarged end 16 connected to the spaced pressure responsive units of the motor described below, the portion 16 being connected to and forming a part of both of said pressure responsive units as also described below. The motor is divided into two parts by a dividing wall indicated as a whole by the numeral 17 and comprising a stamped metal shell 18 the inner periphery of which is connected as at 19 to the outer periphery of a diaphragm 20. The inner periphery of such diaphragm is secured to the body portion 16 by a retaining ring 21. The outer periphery of the shell 18 is shaped and secured to the casing section 12 as described below.

One of the two pressure responsive units of the motor is indicated as a whole by the numeral 24 and comprises a stamped plate 25, shaped in cross section as shown in FIGURE 1, and connected at its inner periphery to the body member 16 in the manner illustrated. The outer periphery of the plate 25 is secured by a welded retaining ring 28 to a bead formed on the inner periphery of a diaphragm 29. This diaphragm is of the rolling type and has its outer portion arranged in contact with a shell 30 the outer periphery of which is bent radially outwardly as at 31 to retain in position a bead 32 formed on the outer periphery of the diaphragm 29. The shell 30 is provided adjacent a portion of the shell 18 with circumferentially spaced inwardly extending bosses 34 to space the body of the shell 30 from the shell 18 to form therebetween a passage 35 (see the bottom of FIGURE 1) communicating with a variable pressure chamber 36 between the pressure responsive unit 24 and the dividing wall 17. The passage 35 also communicates, in a manner to be described, with the second pressure responsive unit of the motor.

The second pressure responsive unit is indicated as a whole by the numeral 40 and comprises a stamped plate 41 against which is arranged the inner portion of a diaphragm 42. The outer portion of such diaphragm is provided with a bead 43, and it will be noted that the outer portion of the shell 18 is provided with a relatively cylindrical portion 44 terminating in a radially outwardly extending flange 45 seating in the bead 43. Thus both the shell 18 and bead 43 are maintained in fixed position relative to the casing sections of the motor. The pressure responsive unit 40 forms with the casing section 12 the second variable pressure chamber 46 of the motor. The radially outer and right-hand faces of the diaphragm bead 43, as viewed in FIGURE 1, are provided with grooves 47 (FIGURE 6) to afford communication between the variable pressure chamber 46 and passage 35. Accordingly, it will be apparent that the two variable pressure chambers 36 and 46 are in fixed communication with each other.

The inner periphery of the plate 41 has a substantially cylindrical portion 50 terminating in a radially inwardly extending flange 51 overlying and spaced from a preferably cast plate 52 having bosses 53 secured to the body portion 16 by screws 54. Accordingly the plate 52 is movable with the axially movable cast member 15. The inner periphery of the diaphragm 42 is fixed by a snap ring 55 to the plate 52. Between the flange 51 and outer periphery of the plate 52 is arranged a play take-up member 58 described in detail later. Such member forms per se no part of the present invention but is broadly a part of the present combination. The member 58 is specifically described and claimed in my copending application Serial No. 846,633, filed October 15, 1959.

An axially movable member 60 has one end slidable in a bore 61 formed in an axially extending sleeve portion 62 formed integral with the plate 52. The sleeve portion 62 is slidable in a combined bearing and sealing unit 63 carried by the casing section 12. The inner end of the member 60 is slidable in sealed engagement with a bore 64 formed in the body portion 16. Intermediate its ends, the member 60 is provided with an annular valve seat 65 inwardly of which the member 60 is provided with radial ports 66 communicating with a bore 67 in the member 60, which bore is always in communication with the atmosphere as described below.

The body 15 is provided with an axially extending force transmitting member 70 provided with a passage 71 in open communication at one end with the passage 67. A spring 72 biases the member 60 toward the right in FIGURE 1. The casing section 11 is formed with a hub portion 75 in the radially outer portion of which is an annular air cleaner 76. Inwardly of such air cleaner is arranged a bearing 77 in which the projection 70 is slidable. This bearing is of the split-ring type and is provided with longitudinal grooves 78 and radial grooves 79 for the free flow of air through the air cleaner. Air is free to flow from the atmosphere to the air cleaner through stamped grooves 80 formed in the casing section 11.

The left-hand end of the axial projection 70 (FIGURE 1) abuts the adjacent end of the plunger 82 of a conventional vehicle master cylinder 83 to transmit movement thereto when the motor is energized. The end of the projection 70 which abuts the master cylinder plunger is radially notched as at 85 for the flow of air into the space 86 within the plunger 82, such space in turn communicating with the passage 71 so that this passage always communicates with the atmosphere.

The air cleaner 76 is retained in position by a plate 90 secured in any suitable manner to the casing section 11. Such plate in turn is secured to the body of the master cylinder 83 by screws 91.

The body portion 16 is provided in the right-hand end thereof (FIGURE 1) with a relatively large chamber 95 communicating as at 96 with a constant pressure chamber 97 formed between the pressure responsive unit 24 and the casing section 11. Within the chamber 95, the body portion 16 is provided with an annular valve seat 98 concentric with and surrounding the valve seat 65.

A valve body 99 is supported with respect to the member 60 by a diaphragm 100 having an inner bead surrounding and carried by the member 60. The valve body 99 carries against its left-hand face (FIGURE 1) a resilient valve element 101, normally engaging the seat 65 and normally disengaged from the seat 98. A spring 102 biases the valve 101 to the left in FIGURE 1.

At circumferentially spaced points, between the bosses 53, the right-hand end of the body member 16 is provided with recesses 105 in each of which is arranged a highly resilient lever fulcrum cushion 106. These cushions are narrower than the recesses 105 so as to be readily deformable to fill such recesses. In the space between each adjacent pair of bosses 53 is arranged a reaction lever 108, the outer end 109 of each of which levers engages the flange 51. The inner end 110 of each lever is arranged in a recess 111 formed in the member 60. The resilient fulcrum members 106 maintain the ends 110 of the levers in engagement with the right-hand end of the groove 111 as viewed in FIGURE 1, while the outer end 109 of each lever is maintained in engagement with the flange 51, as previously stated. Accordingly, there is no play in the off positions of the parts between each lever 108 and the elements with which it is engageable. This is desirable to prevent any chattering of the valve mechanism upon initial operation of the device.

Against the right-hand face (FIGURE 1) of the body portion 16 is arranged a wear plate 112 against which the intermediate portion of each lever 108 is engageable after the fulcrum member 106 has been deformed in the operation of the device.

A return spring 115 is arranged in the motor chamber 97 and acts against the pressure responsive unit 24 to tend to return such unit to normal position. The space between the dividing wall 17 and pressure responsive unit 40 forms a constant pressure motor chamber 117 in which is arranged a combined return and counter-reaction spring 118. One end of this spring bears against the dividing wall 17 and the other end bears against the plate 41 to tend initially to prevent movement of the pressure responsive unit 40, thus tending to prevent the transmission of reaction forces to the member 60 through the levers 108.

To the left of the valve seat 98 (FIGURE 1) and around the adjacent portion of the member 60 is formed a chamber 120 normally communicating with the chamber 95. The chamber 120 communicates through a passage 121 with the motor chamber 36. It will be apparent that the chamber 95 is always in communication with the constant pressure chamber 97, and it is also in constant communication with the motor chamber 117 through the spaces in which the levers 108 are arranged.

Motion is transmitted to the member 60 by actuation of a push rod 125 connected to the vehicle brake pedal to be operated thereby. The connection between the push rod 125 and member 60 is through the medium of a spherical head 126 and rubber washer 127 to permit the rod 125 to partake of some rocking movement as the brake pedal is actuated.

The motor in the present instance is shown as being of the vacuum suspended type, and the motor chamber 97 is accordingly connected to a source of vacuum such as the intake manifold of the vehicle engine. This connection is preferably through a check valve device forming per se no part of the present invention but disclosed and claimed in my copending application Serial No. 810,340, filed May 1, 1959. This check valve comprises a body 130 having a chamber 131 therein communicating with the interior of a nipple 132 connected to the intake manifold. The body 130 is secured as at 133 to the casing section 11. Such casing section is ported as at 134, and such ports are normally closed by a resilient check valve 135 biased to closed position by a spring 136.

The self-adjusting spacer or shim 58 is shown in FIGURE 1 in the form in which it is initially installed. As previously stated, the member 58 forms per se no part of the present invention but is described and claimed in my copending application Serial No. 846,633, referred to above. In motors of the present type, it was found necessary to measure the parts at assembly and to use between elements corresponding to the flange 51 and plate 52 the number of shims necessary to obtain the proper spacing of these parts so as to prevent any play between the reaction levers and the elements with which they contact. The member 58 eliminates such measurements and the use of the number of shims indicated to be necessary by such measurements.

The member 58 is made of ductile metal, for example soft steel plate, so that elements to be described will yield under pressure and then take a set. The member 58 comprises a split ring as shown in FIGURE 4 and is radially notched as at 140 to provide fingers 141 normal to the plane of the material from which the plate 58 is formed. Such fingers alternate with fingers 142 which are bent as shown in FIGURE 2 so that the member 58 acts to relatively substantially space the flange 51 and the outer periphery of the member 52. The remaining portions of the member 58 preferably have their edge portions chamfered as at 143 to permit the member 58 to seat, if necessary, tightly against the flange 51, the radially inner portion of which is connected to the plate portion 50 through a filleted corner. Three sets of the fingers 142 are employed, equally circumferentially spaced, and the ring 58 may be cut away as at 145 to save material.

*Operation*

As distinguished from my copending application Serial No. 760,164, referred to above, the axially movable portion of the pressure responsive units comprises two parts 15 and 52, whereas three parts were required in the prior construction. Moreover, the valve mechanism is mounted in a simple manner on the axially movable member 60 instead of being fixed to an axially movable portion of the motor. The valve mechanism, accordingly, is easily assembled on the member 60 before the insertion thereof into the recess 95. The mounting of the levers 108 also is highly simplified over the copending application just referred to.

In assembling the parts it is unnecessary to perform any accurate measurements for the insertion of shims between the flange 51 and the peripheral portion of the plate 52. The member 58 is placed in position as in FIGURES 1 and 2, with the fingers 142 engaging the flange 51 and urging the latter away from the plate 52. Under such conditions, the resilient fulcrum members 106 will be somewhat deformed. After assembly, when the member 60 is stroked the full distance to its limit of movement, the fulcrum cushions 106 are deformed and the fulcrum points of the levers move into engagement with the wear plate 112. The outer ends 106 of the levers will bear against the flange 51, thus flattening out the adjusting spacer fingers 142 the exact distance to be firmly in contact with the flange 51 at the full stroke of the piston. The stock thickness or strength of the spacer tabs or fingers 142 is such that they are weaker than the levers 108, as will be obvious, to yield during the adjusting movement, yet strong enough to maintain the over-all thickness of the spacer member in the normal operation of the unit.

In operation, the brake pedal will be depressed to move the rod 125 to the left in FIGURE 1 to similarly move the valve seat 65, such movement being followed by the valve element 101 until such element contacts the seat 98. The valve mechanism will now be in lap position, and the chamber 95 will be cut off from the chamber 120. The chamber 95 is always in communication with the source of vacuum connected to the chamber 97, while the chamber 120 is always in communication through passage 121 with the motor chamber 36. The latter chamber, in turn, is always in communication through passage 35 and grooves 47 with the motor chamber 46. The motor chambers 36 and 46, accordingly, will now be cut off from communication with the source of vacuum.

Further movement of the member 60 leaves the valve element 101 in engagement with the seat 98 and moves the seat 65 out of engagement with the valve element. The atmospheric passage 67 will now be connected to the chamber 120 to supply air to the motor chambers 36 and 46, whereupon both pressure responsive units 24 and 40 will move toward the left in FIGURE 1.

The pressure responsive unit 24 is positively connected to the axially movable body 15 and accordingly transmits to the plunger 82 forces developed by differential pressures in the motor chambers 36 and 97. The pressure responsive unit 40 is movable relative to the unit 24 and transmits its force to the latter in a manner to be described. Attention is invited to the fact that when the rod 125 is initially moved to start energization of the motor, the highly resilient cushion members 106 permit such movement without appreciable resistance to movement of the rod 125. The mechanism accordingly provides a soft initial pedal and the three contact points of each lever start and remain in engagement with the flange 51, fulcrum cushions 106 and the right-hand end of the groove 111. The slight deforming of the cushions 106 prevents any wobbling of the levers 108 and consequently prevents any chattering of the valve mechanism.

The spring 118 serves as a return spring for the pressure responsive unit 40 and as a counter-reaction spring to delay the transmission of substantial reaction to the brake pedal through the medium of the levers 108. The pressure responsive unit 40 being movable relative to the unit 24, it will be seen that upon initial light energization of the motor units there would be a tendency, in the absence of the spring 118, as the pressure responsive unit 24 moves forwardly or to the left, for the unit 40 to move in the same direction but to a greater extent. The spring 118 absorbs a substantial proportion of the power of the pressure responsive unit during initial admission of pressure into the motor chamber 46. Therefore during such initial operation, there is no swinging of the levers 108 and hence no transmission of reaction to the rod 125 and to the brake pedal. In other words, the spring 118 tends to oppose movement of the pressure responsive unit 40 and this unit is initially caused to move at the same speed and to the same extent as the pressure responsive unit 24 and the body 15. Therefore, there will be little force transmitted through the levers 108 to react against the brake pedal, thus rendering initial pedal operation "soft" as is desirable. However, at the point at which substantial resistance to movement of the master cylinder plunger 82 is encountered, namely, at the point of initial engagement of the brake shoes with the drums, the loading of the spring 118 will be insufficient to prevent movement of the pressure responsive unit 40 relative to the unit 24. Such movement thereupon takes place, and since the flange 51 moves to the left in FIGURE 1 relative to the cast body 15, the inner ends of the levers 108 will act against the right-hand shoulder of the groove 111 to resist movement of the rod 125 and thus transmit reaction forces to the brake pedal. The force applied to the lever ends 109 to tend to turn them will be proportionate to the ratio of the resistance to movement of the master cylinder plunger to the differential pressures in the motor chambers 46 and 117, and the reaction forces transmitted to the brake pedal thus will reflect the resistance to movement of the master cylinder plunger 82.

As energization of the motor units continues, the forces applied to the fulcrum cushions 106 will increase until the adjacent portions of the levers 108 contact the wear plate 112. From that point on, positive forces will be transmitted to the body member 15 by the flange 51 and by the push rod 125.

It will be noted that movement of the member 60 to the left is limited by play at the left-hand end thereof. This play will be taken up upon maximum energization of the motor, after which direct pedal forces will be transmitted to the body member 15 and further application of the brakes will be limited only by the ability of the operator to exert force against the brake pedal.

The releasing of the parts for movement toward off positions will be rather apparent. Upon the releasing of the brake pedal, the spring 72 restores the valve mechanism to normal condition, the motor chambers 36 and 46 being cut off from the atmosphere by the valve seat 65 and again connected to the chamber 95 to re-establish vacuum conditions in the chambers 36 and 46. The springs 115 and 118 then return the pressure responsive units of the motor to their normal off positions.

From the foregoing, it will be apparent that the present construction has all of the advantages of the structure of Patent No. 2,980,068, referred to above, over which the present construction is a substantial improvement. Greater booster motor power is provided within the limits of the same maximum motor diameter. The parts are greatly simplified both as to structure and installation, and accordingly the present construction is not only more economical to make and assemble, but provides improved functional characteristics.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a casing, a pair of pressure responsive units therein each having a variable pressure chamber at one side thereof and a constant pressure chamber at the other side thereof, a member to be operated positively connected to one of said pressure responsive units and projecting from the adjacent end of said casing, the other pressure responsive unit being movable axially relative to said one pressure responsive unit, a first spring engaging at one end against said other pressure responsive unit to bias it against movement toward said one pressure responsive unit, a return spring arranged between said one pressure responsive unit and said adjacent end of said casing, a valve mechanism normally balancing pressures in said motor chambers and movable to connect said variable pressure chambers to a source of pressure to operate both units, said valve mechanism comprising a manually operable member projecting through the other end of said casing, said other pressure responsive unit comprising a plate, and reaction means connected between said plate and said manually operable member to transmit to the latter reaction forces occurring when said other pressure responsive unit moves against the loading of said first spring incident to resistance to movement of said member to be operated.

2. A motor mechanism according to claim 1 wherein said reaction means comprises levers engaging at their outer ends against said other pressure responsive unit and at their inner ends against said manually operable member, and fulcrum means fixed with respect to said one pressure responsive unit and engaging said levers intermediate their ends.

3. A motor mechanism according to claim 1 wherein said reaction means comprises levers engaging at their outer ends against said other pressure responsive unit and at their inner ends against said manually operable member, said one pressure responsive unit having a radially inner portion forming with said member to be operated a unitarily movable structure provided adjacent said plate with circumferentially spaced recesses, and cushion fulcrum members arranged in said recesses and engaging said levers intermediate their ends.

4. A motor mechanism according to claim 1 wherein said one pressure responsive unit has a radially inner portion forming with said member to be operated a unitarily movable structure, said plate being provided with bosses secured to said movable structure, said reaction means comprising levers projecting radially between said bosses and engaging at their respectively outer and inner ends against said other pressure responsive unit and said manually operable member and engaging intermediate their ends with said movable structure.

5. A fluid pressure motor mechanism comprising a casing, a pair of pressure responsive units therein each having a variable pressure chamber at one side thereof and a constant pressure chamber at the other side thereof, a member to be operated positively connected to one of said pressure responsive units and projecting from the adjacent end of said casing, said one pressure responsive unit having a radially inner portion forming with said member to be operated a unitarily movable structure the other pressure responsive unit being movable axially relative to said one pressure responsive unit, a first spring engaging at one end against said other pressure responsive unit to bias it against movement toward said one pressure responsive unit, a return spring arranged between said one pressure responsive unit and said adjacent end of said casing, a valve mechanism balancing pressures in said motor chambers and movable to connect said variable pressure chambers to a source of pressure to operate both units, said valve mechanism comprising a manually operable member projecting through the other end of said casing, said other pressure responsive unit comprising radially inner and outer plates having overlapping portions, radial reaction levers engaging at their inner ends against said manually operable member and at their outer ends against one of said overlapping portions, cushion means carried by said movable structure and engaging said levers intermediate their ends, and means having bendable portions arranged between and engaging said overlapping portions of said plates to eliminate play between said levers and said elements with which they are engageable when said pressure responsive units are in normal off positions.

6. A fluid pressure motor mechanism comprising a casing, a pair of pressure responsive units therein each having a variable pressure chamber at one side thereof and a constant pressure chamber at the other side thereof, a body fixed to one of said pressure responsive units and having a force transmitting member projecting toward the adjacent end of said casing, said body toward the other end of said casing having an enlarged control chamber communicating with said constant pressure chambers and with a source of low pressure, a follow-up valve mechanism comprising an axially movable manually operable member projecting through said other end of said casing and through the other pressure responsive unit and provided with a valve seat, a valve seat carried by said body in said chamber and a valve device flexibly connected to said manually operable element and having a valve element engageable with said seats and operable for disconnecting said variable pressure chambers from said control chamber and connecting said variable pressure chambers to a source of higher pressure, said other pressure responsive member being mounted for movement axially relative to said one pressure responsive unit, means resiliently opposing such relative movement of said other pressure responsive unit, and reaction means connected between said other pressure responsive unit and said manually operable member for opposing valve operating movement of the latter when said resilient means yields incident to predetermined resistance to movement of said force transmitting member.

7. A motor mechanism according to claim 6 provided with a return spring engaging at opposite ends against said one pressure responsive unit and said adjacent end of said casing, said means resiliently opposing said relative movement of said other pressure responsive unit comprising a compression spring having one end stationary and its other end engaging said other pressure responsive unit to bias it against movement toward said one pressure responsive unit.

8. A motor mechanism according to claim 6 wherein said one pressure responsive unit has a radially inner portion forming with said force transmitting member a unitarily movable structure, said reaction means comprising a plurality of radial levers engaging at their outer and inner ends respectively with said other pressure responsive unit and said manually operable member, and fulcrum means carried by said movable structure and engaging said levers intermediate their ends.

9. A motor mechanism according to claim 6 wherein said one pressure responsive unit has a radially inner portion forming with said force transmitting member a unitarily movable structure, a return spring engaging at opposite ends against said one pressure responsive unit and said adjacent end of said casing, said means resiliently opposing said relative movement of said other pressure responsive unit comprising a compression spring having one end stationary and its other end engaging said other pressure responsive unit to bias it against movement toward said one pressure responsive unit, said reaction means comprising radial levers each engaging at its radially outer and inner ends respectively with said other pressure responsive unit and with said manually operable member, and resilient fulcrum means carried by said movable structure and engaging each lever intermediate the ends thereof.

10. A fluid pressure motor mechanism comprising a casing, a pair of pressure responsive units therein each having a variable pressure chamber at one side thereof and a constant pressure chamber at the other side thereof, a force transmitting member fixed to one of said pressure responsive units and projecting through the adjacent end of said casing, the other pressure responsive unit being axially movable relative to said one pressure responsive unit, spring means engaging said other unit to bias it against movement toward said one unit, a return spring between said one pressure responsive unit and said adjacent end of said casing, a valve mechanism normally balancing pressures in said motor chambers and movable to connect said variable pressure chambers to a source of pressure to operate both pressure responsive units, said valve mechanism comprising a manually operable member projecting through the other end of said casing and a valve body connected to said manually operable member, and reaction means arranged between said valve body and said other end of said casing and connected between said other pressure responsive unit and said manually operable member to transmit to the latter reaction forces occurring when said other pressure responsive unit moves against the loading of said spring means incident to resistance to movement of said force transmitting member.

11. A fluid pressure motor mechanism comprising a casing, a pair of pressure responsive units therein each having a variable pressure chamber at one side thereof and a constant pressure chamber at the other side thereof, a force transmitting member fixed to one of said pressure responsive units and projecting through the adjacent end of said casing, said one pressure responsive unit having a radially inner portion forming with said force transmitting member a unitarily movable structure, the other pressure responsive unit being axially movable relative to said one pressure responsive unit, spring means engaging said other unit to bias it against movement toward said one unit, a return spring between said one pressure responsive unit and said adjacent end of said casing, a valve mechanism normally balancing pressures in said motor chambers and movable to connect said variable pressure chambers to a source of pressure to operate both pressure responsive units, said valve mechanism comprising a manually operable member, and radial reaction levers arranged between said valve body and said other end of said casing, said levers engaging at their respectively outer and inner ends against said other pressure responsive unit and said manually operable member and having fulcrum engagement intermediate their ends with said movable structure.

12. A motor mechanism according to claim 11 wherein said movable structure is provided with resilient cushion means engaging said levers and providing the fulcrum engagement between said levers and said one pressure responsive unit, said pressure responsive units having normal off positions, and means carried by said other pressure responsive unit for holding the latter in engagement with said levers and for holding said levers in engagement with said cushion means and with said manually operable member when said pressure responsive units are in said normal off positions.

13. A fluid pressure motor mechanism comprising a casing, a pressure responsive unit therein having constant and variable pressure chambers at opposite sides thereof, a force transmitting member projecting through one end of said casing, means for transmitting forces from said pressure responsive unit to said force transmitting member, a valve mechanism normally balancing pressures in said constant and variable pressure chambers and movable to connect said variable pressure chamber to a source of pressure, said valve mechanism comprising a manually operable member projecting through the other end of said casing and a valve body flexibly connected to said manually operable member, said force transmitting means comprising reaction levers arranged between said valve body and said other end of said casing, said levers engaging at their radially outer and inner ends respectively with said pressure responsive unit and with said manually operable member, cushion fulcrum members connected to said force transmitting member and engaging said levers intermediate their ends, and take-up means carried by said pressure responsive unit for maintaining the latter in engagement with said levers and for maintaining said levers in engagement with said fulcrum members and with said manually operable member when said pressure responsive unit is in a normal off position.

14. A mechanism according to claim 13 wherein said pressure responsive unit is provided with spaced overlapping portions, said take-up means comprising a ring-like member of ductile metal engaging against one of said overlapping portions and having bent fingers engaging the other of said overlapping portions, said overlapping portions being movable axially relative to each other whereby said bent fingers maintain said other overlapping portion in engagement with the outer ends of said levers.

References Cited in the file of this patent

UNITED STATES PATENTS

| | | |
|---|---|---|
| 2,322,063 | Schnell | June 15, 1943 |
| 2,393,524 | Fant | Jan. 22, 1946 |
| 2,404,932 | Stelzer | July 30, 1946 |
| 2,413,380 | Rush et al. | Dec. 31, 1946 |
| 2,587,403 | Stelzer | Feb. 26, 1952 |
| 2,802,455 | Ingres | Aug. 13, 1957 |
| 2,834,184 | Ingres | May 13, 1958 |
| 2,884,905 | Jensen | May 5, 1959 |